United States Patent [19]
Bartholomew et al.

[11] Patent Number: 5,319,634
[45] Date of Patent: Jun. 7, 1994

[54] MULTIPLE ACCESS TELEPHONE EXTENSION SYSTEMS AND METHODS

[75] Inventors: David B. Bartholomew, West Valley City; A. Ray Ivie, Orem; Alma K. Schurig, Provo, all of Utah

[73] Assignee: Phoenix Corporation, Midvale, Utah

[21] Appl. No.: 773,009

[22] Filed: Oct. 7, 1991

[51] Int. Cl.$^5$ .................. H04B 7/204; H04J 13/00; H04J 3/16
[52] U.S. Cl. ............................... 370/18; 370/50; 370/95.3; 375/1; 379/61; 455/56.1
[58] Field of Search .................. 370/11, 18, 24, 29, 370/30, 69.1, 95.3, 50, 70, 95.1; 375/1, 38, 40; 379/58, 59, 60, 61; 380/34; 455/33.1, 33.2, 34.1, 54.1, 49.1, 53.1, 56.1

[56] References Cited

U.S. PATENT DOCUMENTS

| | | | |
|---|---|---|---|
| 4,218,655 | 8/1980 | Johnston | 455/39 |
| 4,222,035 | 9/1980 | Loholf | 340/310 A |
| 4,254,403 | 3/1981 | Perez-Cavero | 340/310 R |
| 4,455,651 | 6/1984 | Baran | 370/18 |
| 4,475,193 | 10/1984 | Brown | 370/124 |
| 4,479,033 | 6/1985 | Brown | 370/30 |
| 4,523,307 | 10/1984 | Brown | 370/30 |
| 4,559,520 | 12/1985 | Johnston | 340/310 R |
| 4,641,126 | 2/1987 | Crowe | 340/310 A |
| 4,641,322 | 2/1987 | Hasegawa | 375/1 |
| 4,688,210 | 8/1987 | Eizenhöfer et al. | 370/18 |
| 4,701,945 | 10/1987 | Pedigo | 379/66 |
| 4,759,016 | 6/1988 | Otsuka | 370/95.3 |
| 4,783,780 | 11/1988 | Alexis | 370/95.3 |
| 4,864,589 | 9/1989 | Endo | 375/1 |
| 4,901,307 | 2/1990 | Gilhousen et al. | 370/18 |
| 4,963,853 | 10/1990 | Mak | 340/310 A |
| 4,968,970 | 11/1990 | Le Porte | 340/310 A |
| 5,101,501 | 3/1992 | Gilhousen et al. | 379/60 |
| 5,136,612 | 8/1992 | Bi | 370/18 |

Primary Examiner—Douglas W. Olms
Assistant Examiner—Alpus H. Hsu
Attorney, Agent, or Firm—Jon C. Christiansen; Lee A. Hollaar; Daniel P. McCarthy

[57] ABSTRACT

A method and system for conducting multiple access simultaneous telephone communications in full duplex either over the power lines of a building or using RF transmission. It employs a combination of multiple access techniques selected from among the following: time division, code division, and frequency division. The following features result: a) security coding to prevent unauthorized access and eavesdropping, b) multiple simultaneous conversations through identical and closely coupled transmission media, c) non-interference to other communications systems and users, and d) processing gain for operating in noisy environments.

19 Claims, 14 Drawing Sheets

MULTIPLE ACCESS TELEPHONE EXTENSION SYSTEMS AND METHODS

BACKGROUND

1. The Field of the Invention

This invention relates generally to digital communication systems and, particularly, to such systems which provide for multiple access to a plurality of signals carried on a single communications medium. More specifically, this invention relates to telephone extension systems, by which signals are transferred simultaneously between a plurality of telephone lines and telephone extensions by means of the AC power lines of a building or an RF (radio frequency) transmission medium.

2. The Background Art

When conventional telephone systems are installed in a building, a significant expense is frequently associated with running the necessary telephone wires for all desired telephone extensions. In an existing building, the telephone installation process may also significantly disrupt the building's normal use. Moreover, due to the time and expense involved, the installation is very often not susceptible to convenient modification, despite changes in the needs of the telephone system user.

In an effort to overcome the foregoing disadvantages, various types of wireless telephone systems have been developed. Wireless telephone systems typically include a base unit which receives the telephone signal from a conventional telephone line. The signal is then transmitted between the base unit and one or more extension locations in some manner. Most commonly, the telephone signal is transmitted between the base unit and the extensions using conventional radio frequency (RF) transmission signals and techniques. More recently, however, attempts have been made to transmit the telephone signal using the existing power lines of the building. These prior efforts have had varying degrees of success.

For example, one of the major deterrents in transmitting telephone signals over existing power lines is the nature of the power line medium itself, which presents a low and variable impedance to carrier signals as well as an extremely noisy communications environment. Studies have demonstrated that the optimum carrier frequency range lies between 3 and 15 MHz. Most prior art attempts to operate below 2 MHz have failed commercially because of noise or interference problems from other equipment operating on the electrical system.

Numerous prior art signal modulation techniques have also been attempted, primarily employing FM modulation of the carrier by audio (speech) signals (U.S. Pat. Nos. 3,949,172 and 4,701,945 being examples, the disclosures of which are incorporated herein by this reference). The problem with FM modulation is that no security is afforded the users; that is, other users with the same devices can make calls on another user's line and eavesdrop on conversations. The impact of these problems has already been demonstrated in the cordless telephone industry, which shares the same limitations as the line carrier industry. Additionally, commercial AM and FM broadcast stations are often heterodyned and demodulated in the RF range utilized by these systems, thereby interfering with the reception of telephone conversations. The transmissions from one of these systems will often also radiate and interfere with other types of FCC licensed and unlicensed commercial and residential equipment. Even the use of two FM modulation stages, as described in U.S. Pat. No. 4,701,945, is not able to solve these problems.

In prior art systems, full duplex voice communication is usually attempted by using two carrier frequencies, one for each direction. Usually a transmitter and receiver are included in each station which are operating simultaneously. This leads to mutual interference as well as increasing the normal interference drift problems and does not eliminate the security problems.

Recently, attempts have been made to transmit relatively low frequency digital data (<2 Kbs) via a line carrier and employing a multiple access technique known as direct spread. (See, for example, U.S. Pat. Nos. 4,641,322 and 4,864,589, the disclosures of which are incorporated herein by this reference.) Generally, the carrier frequencies (200-500 KHz) and corresponding data rates (20-1000 bs) are too low to provide sufficient processing gain to permit real time full duplex voice communication which generally requires about 100 Kbs. The systems using direct spread techniques also typically employ line carrier remote data collection and control applications for which high speed multiple channel data transmission is not required. Such systems likewise do not typically accommodate more than one system using the same power lines in the same building.

In summary, therefore, no prior art line carrier telephone extension system is known which permits private, multiple line, high quality duplex voice communications which does not interfere with other electronics systems.

BRIEF SUMMARY AND OBJECTS OF THE INVENTION

In view of the foregoing, it is a primary object of the present invention to provide an effective method of multiple access communication which provides for multiple access of a plurality of signals on a single communications medium.

It is also an object of the present invention to provide a method and system of line carrier communications utilizing both TDMA (time division multiple access) and CDMA (code division multiple access) to permit high data rates and multiple access by two or more telephone lines.

Further, it is an object of the present invention to provide a method and system of line carrier telephone communications which utilizes CDMA (code division multiple access) to provide a high degree of security for preventing unauthorized access to the subscriber's line, and which provides privacy with respect to the conversation from third parties.

It is a still further object of the present invention to provide a method and system of code synchronization to provide multiple extensions for the same subscriber line which do not interfere with each other.

An additional object of the present invention is to provide a method and system of line carrier telephone communications which utilizes FDMA (frequency division multiple access) in combination with CDMA (code division multiple access) to prevent interference between relatively close neighboring transmission systems or partner transmissions in the same system and to provide for multiple access (simultaneous transmission) of duplex signals for at least one telephone line.

Also, it is an object of the present invention to provide a method and system of multiple access cordless telephone extension communications which applies the same techniques to obtain the same advantages as for the line carrier telephone extension systems and methods.

Consistent with the foregoing objects, and in accordance with the invention as embodied and broadly described herein, a telephone communications system and method is disclosed in one embodiment of the present invention for conducting multiple access simultaneous telephone communications in full duplex either over the power lines of a building or over a common RF transmission means. The method employs a combination of multiple access techniques selected from among the following: time division, code division, and frequency division. The following features result: a) security coding to prevent unauthorized access and eavesdropping, b) multiple simultaneous conversations through identical and closely coupled transmission media, c) non-interference to other communications systems and users, and d) processing gain for operating in noisy environments. The method also relates to improvements in cordless telephone communication.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 7 (i.e.

DETAILED DESCRIPTION OF THE PREFERRED EMBODIMENTS

Figure 1:
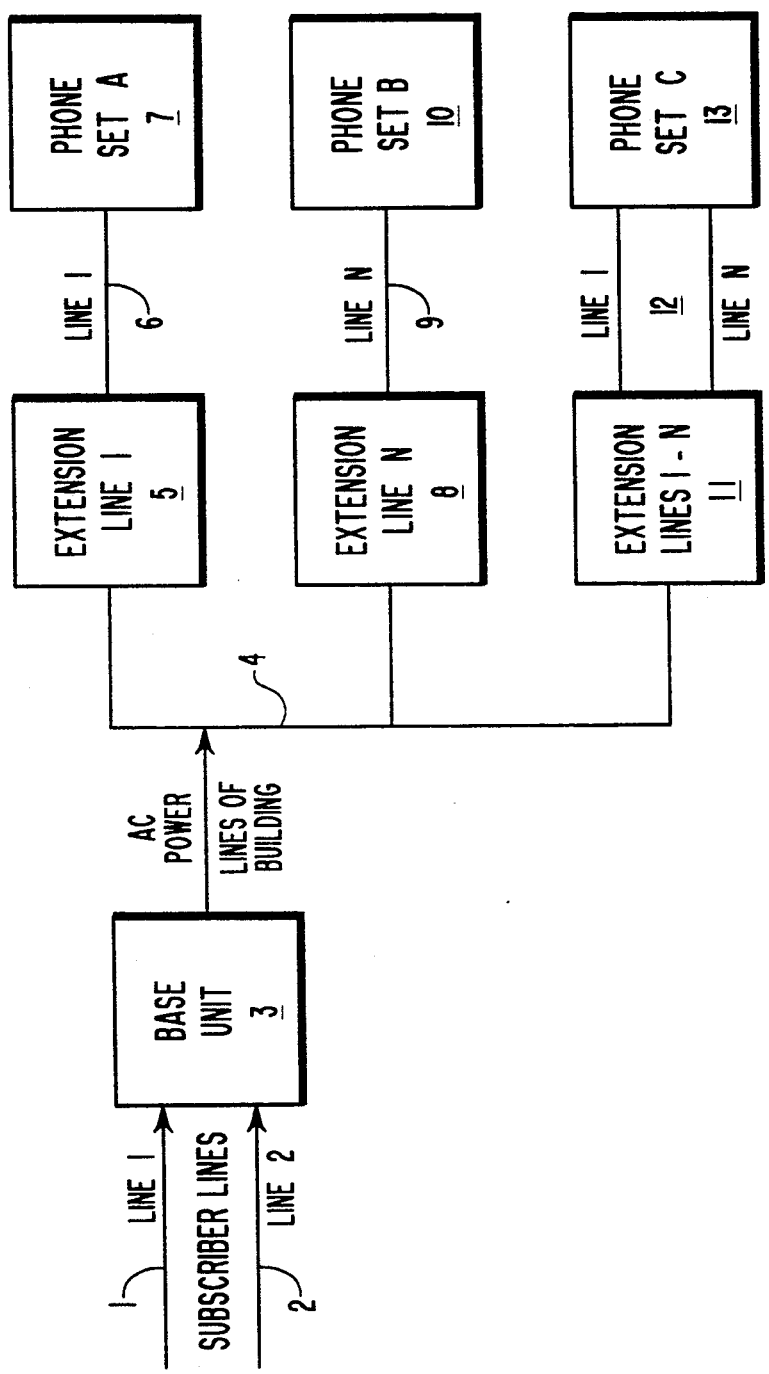
FIG. 1 is a block diagram of a line carrier telephone extension system in accordance with one presently preferred embodiment of the present invention, the system servicing a plurality of subscriber lines and corresponding extension phone sets.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

It will be readily apparent from the discussion which follows that the present invention is adapted for use in a wide variety of specific communications applications, including telephone communications. The present invention may likewise be used with virtually any communications medium, such as, for example, RF signals or line carriers such as the power lines in a building. Nevertheless, in order to simplify the following discussion, the presently preferred embodiments of the present invention will be described below with specific reference to a telephone communications system which employs line carriers as the communications medium.

An increasing number of people live in apartments and condominiums which share power lines. It is, therefore, important for a telephone extension system to utilize multiple access techniques in a unique and skillful manner so as to permit acceptable operation. Many prior art limitations can be overcome by proper application of multiple access techniques as employed in the instant invention.

The following specific multiple access (MA) techniques are employed in the presently preferred embodiments of the present invention:

A) Time Division Multiple Access (TDMA), and two spread spectrum techniques, namely:

B1) Code Division Multiple Access (CDMA), often called direct spread, which can include subcarrier CDMA, and B2) Frequency Division Multiple Access (FDMA), which includes frequency hopping techniques and deployment of multiple simultaneous transmission frequencies.

These techniques are more fully described in a work by Robert C. Dixon, "Spread Spectrum Systems," 2nd Ed., John Wiley & Sons, (U.S.A., 1984), which is made a part hereof by reference.

TDMA (time division multiple access) is employed in the instant invention to permit the bidirectional transmission of duplex voice data for one or more subscriber lines which are "partners" in the same multiline installation. A single base unit interfaces with the subscriber lines and transmission medium (AC power line) and controls the transmission of bidirection 1 voice data by breaking the transmissions into time frames and windows, in which each communications channel is assigned a specific transmit and receive time window. By this means the system controller can guarantee that only one transmission will occupy the medium at one time. The frequency with which each frame of windows is repeated (20–40 KHz) is high enough to transfer high speed voice data.

CDMA (code division multiple access) provides four benefits: security, privacy, low interference with other FCC licensed systems and antijamming margin from interference and competing users. The fact that neighboring users may wish to make simultaneous use of the transmission medium requires that the transmission be coded so that a casual neighbor cannot access (transmit to) another's phone line to make long distant calls ("security") or intercept (eavesdrop/receive) their conversation ("privacy"). CDMA also spreads the radiation spectrum of the transmission energy over a very wide bandwidth (2–10 MHz) so that the energy content of any licensed or unlicensed narrow band is too small to interfere with FCC licensed users. CDMA also rejects many types of power line interference due to inherent "processing gain"; and the multiple access feature of using mutually orthogonal codes prevents jamming interference between users of similar telephone extension systems if their signals are below the "jamming margin". A discussion of these terms follows.

Processing gain (Pg) is acquired by using more bandwidth than the data requires. Processing gain is defined by the following equation:

$$Pg = \frac{\text{RF BANDWIDTH}}{\text{DATA BW}} = \frac{5000 \text{ KHz}}{100 \text{ KHz}} = 50 == 17 \text{ dB}.$$

Thus, if the RF bandwidth is 5 MHz and the data bandwidth is 100 KHz then the processing gain would be 50 times or 17 dB. Since approximately 6 dB of gain is required for correlation and demodulation, the resultant 11 dB is the jamming margin (Mj) (i.e., $Mj = Pg - 6$ dB). A 10 dB Mj would provide that ten jamming sources of equal strength or distance to the "friendly" signals could be rejected, or one "unfriendly" source of equal strength ten times closer, or one unfriendly source ten times greater in strength and equal in distance. For this reason, CDMA cannot be relied upon to carry the burden of jamming margin for near jamming sources. The CDMA jamming margin is also related to code length which is the number of code generator clock cycles ("chips") a code generator will cycle through before the code pattern repeats; but as long as the code length exceeds the processing gain, the main advantage gained by using long codes is privacy and security related.

Because of the limitations of CDMA (code division multiple access) to provide a high antijamming margin for near neighbors, FDMA (frequency division multiple access) is employed to the extent that it is limited by the bandwidth of the media. Thus, if the center frequency of near neighbors were offset by 1 to 3 MHz, the correlation and recovery of the required IF (intermediate frequencies) is diminished substantially.

Prior art line carrier and cordless telephone extension systems do not combine the advantages of the forms of multiple access technology described above. Consequently, they suffer from significant operational disadvantages which are believed to be overcome by system and method of the present invention, a presently preferred embodiment of which will now be described in greater detail.

Reference is first made to FIG. 1 which illustrates one presently preferred embodiment of a line carrier telephone extension system in accordance with the present invention. As shown, the line carrier telephone extension system in FIG. 1 services a plurality of subscriber lines 1–2 and corresponding extension phone sets 7, 10 and 13. Subscriber lines 1 and 2 plug into base unit 3 which provides the interface circuitry and protocols for the subscriber line signals (including ring, off hook and duplex audio signals), and for multiple access power line carrier signals, which are carried through a building via AC power lines 4 to extension interface units 5, 8 and 11. The extension units 5 and 8 are single line extensions and provide means to interface the multiple access line carrier signals to single line phone sets 7 and 10 via lines 6 and 9, respectively. Extension unit 11 provides means to interface the multiple access line carrier signals to a multiline phone set 13 via lines 12.

A line carrier system as illustrated in FIG. 1 must operate in a manner which is transparent to the extension phone set user. Thus, by means of base unit 3, AC power lines 4 and extension unit 5, an incoming ring signal is detected in the base unit, encoded into multiple access line carrier signals, transferred to the power lines 4, decoded in the extension unit 5 and converted to a ring signal for extension phone set 7.

When a user picks up the receiver of an extension phone set, it goes off hook, which condition is detected in the extension unit 5, encoded by said extension unit into multiple access line carrier signals and transmitted via power lines 4 to the base unit 3 where the line carrier signals are decoded and the subscriber line is captured by off hook circuitry. Duplex audio circuitry then connects to the line and bidirectional transmission of voice and/or dial tones and DTMF (dual tone multifrequency) signals takes place, with the voice being encoded into multiple access line carrier signals, transmitted via power lines 4 and decoded back into voice in the base and extension units 3 and 5, respectively. Specific subsystems and corresponding functions will be addressed with reference to FIGS. 4 through 8.

While in the preferred embodiment the voice signals are encoded into multiple access line carrier signals by converting the analog voice signals to digital representations using a analog-to-digital converters or CO-DECs, an alternative embodiment of the invention could use a frequency-modulation encoding or modulation technique. Such encoding techniques are well-known in the art.

Alternatively, the preferred embodiment can directly transmit digital data by eliminating the analog-to-digital converters and directly connecting a digital input in place of the output of the analog-to-digital converter. The preferred embodiment can also directly produce digital output by eliminating the digital-to-analog converter in the receiving subsystem and using the digital signal previously connected to the digital-to-analog converter as the digital output.

Figure 2:
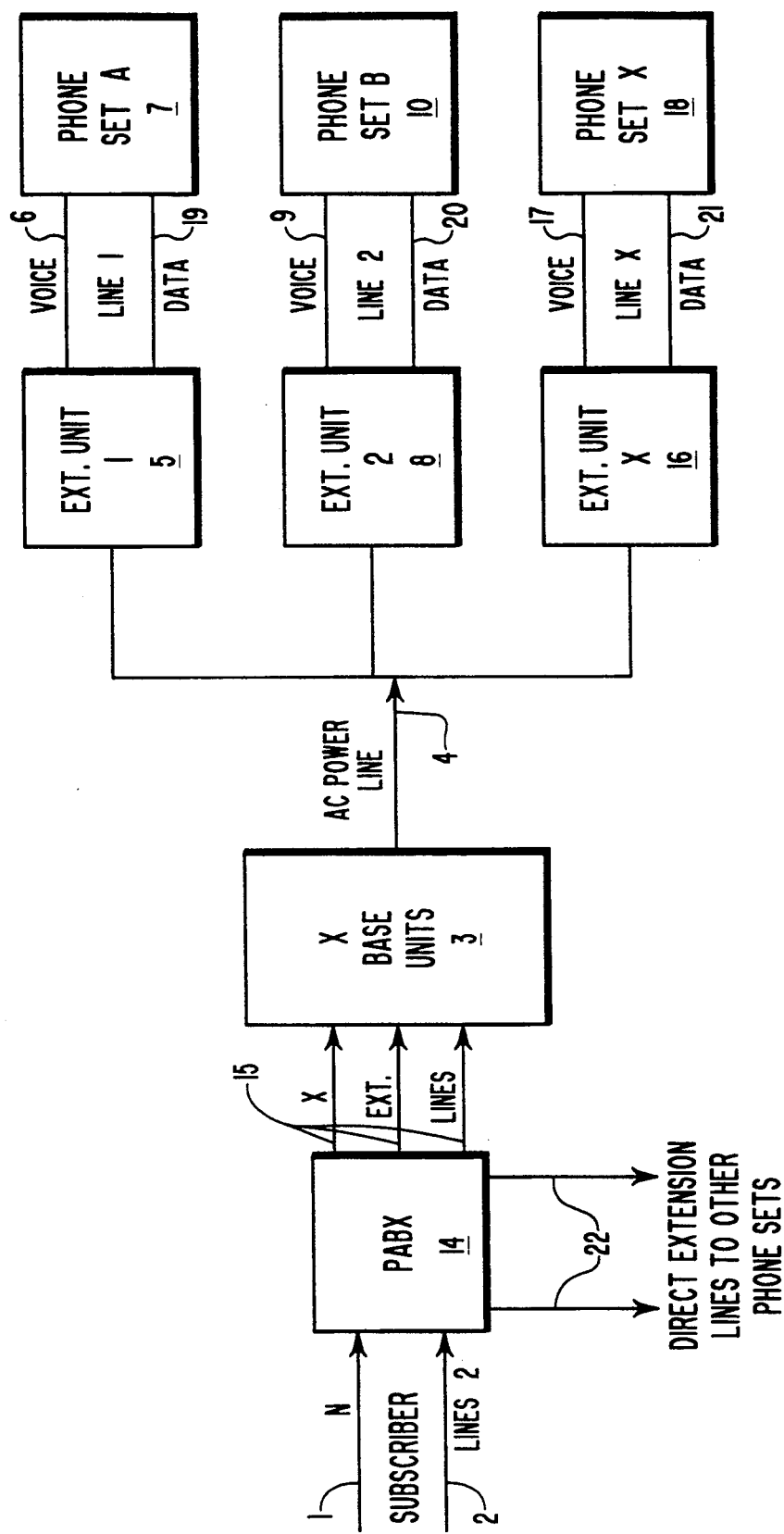
FIG. 2 is a block diagram of a line carrier PABX telephone extension system in accordance with one presently preferred embodiment of the present invention, the system servicing a plurality of line carrier extension phones and conventional extension phones.

Another embodiment of a multiple access line carrier system in accordance with the present invention is illustrated in FIG. 2 and involves replacing conventional PAB extension lines 22 with multiple access line carrier systems, which can be easily installed and moved. As shown, subscriber lines 1–2 connect to PABX unit 14 which provides a plurality of extension phone lines 22 and 15. Extension lines 15 connect to multiple access base units 3 while some of the extension lines 22 connect in a conventional manner to other phone sets. Bas units 3 interface the PABX signals to the AC power lines 4 of a building, as previously described. Multiple access extension units 5, 8 and 16 interface the line carrier signals to phone sets 7, 10 and 18 via voice and data lines 6, 9, 17, and 19-21, said data lines 19-21 providing PABX control signals to phone sets 7, 10, and 18, or, alternatively, digital data for digital communications equipment, such as, for example, computers and fax machines.

Figure 3:
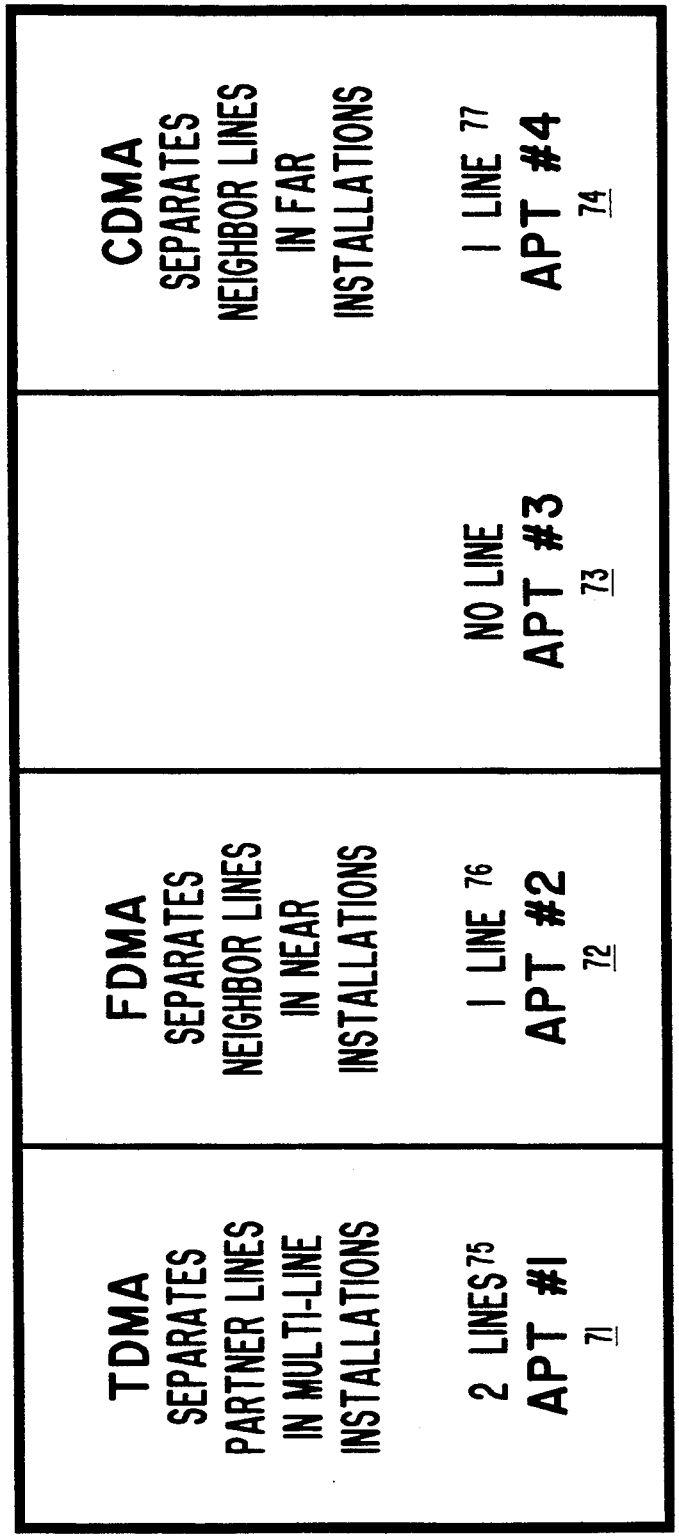
FIG. 3 a is multiple access signal coverage diagram illustrating the deployment and combination of multiple access techniques for solving near-far problems and simultaneous use of a transmission medium in accordance with one presently preferred embodiment of the present invention.

The relative advantages of using various multiple access techniques are depicted in FIG. 3. Four apartments 71-74 are shown which are located in the same building and which share a common power line transformer secondary. Apartment #1 71 has two phone lines 75 which are connected to a base unit 3 (FIG. 4) of the instant invention, not shown. Apartment #2 72 adjoins apartment #1 71 and has one line 76 connected to a base unit 3. Apartment #3 73 separates apartment #4 74 from apartment #2 72 and, while apartment #3 73 may have a phone line, it is not connected to a base unit. Apartment #4 74 has a phone line 77 connected to a base unit.

Using TDMA, different signals are sent at different times as orchestrated by the system controller of a base unit. TDMA techniques are, therefore, used to separate the signals from the two "partner" lines 75 of apartment #1 so that there is no mutual interference between them.

The other two apartments 72 and 74 have independent base units which use the same transmission medium as apartment 71, that is, the power lines of the same apartment building. FDMA techniques are used to separate apartment #2 72 from the other two competitors (71 and 74), since the IF (intermediate frequency) filters of the units are sufficient to block strong local competitors of different frequencies, as will be described in further detail below. There is not sufficient bandwidth in the medium to provide more than a few alternate frequencies. Therefore, FDMA is used to avoid interference from competitors which are relatively "near" and, fortunately, relatively few.

A greater number of neighbors ("competitors") exists which are relatively "far" from each other, of which apartment #4 74 and apartment #1 71 are examples. CDMA techniques possess sufficient jamming margin to reject interference from weaker, more "far" away, competitors. It is also a major characteristic of CDMA to provide a low probability of interception from eavesdropping receivers, even at "near" distances, which is why CDMA is employed in all cases.

Figure 4:
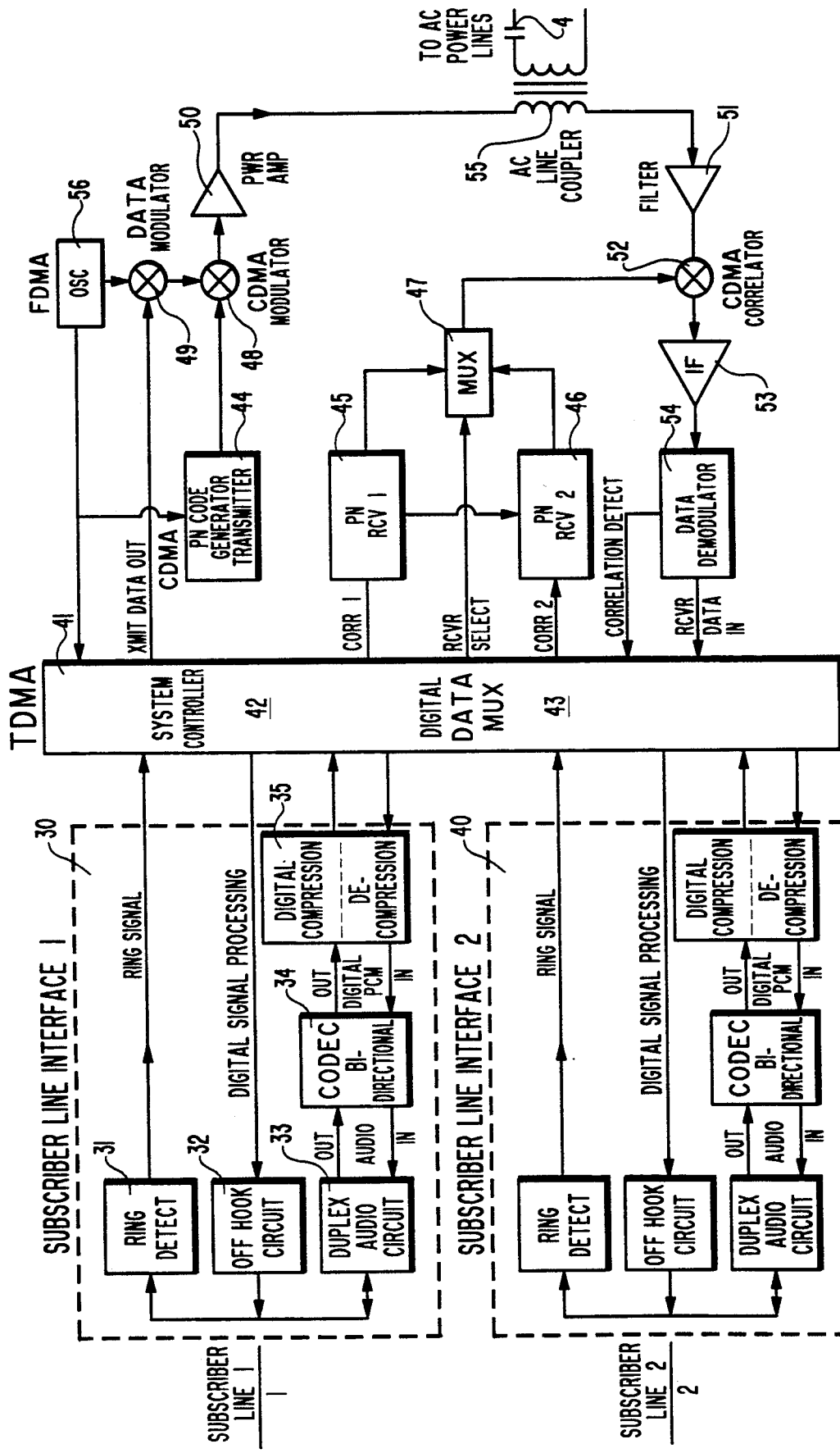
FIG. 4 is an electrical block diagram of a base unit of a multiple access line carrier telephone extension system in accordance with one presently preferred embodiment of the present invention, said base unit interfacing a plurality of subscriber lines to the power line distribution system of a building.

A multiple access base unit 3 is functionally diagramed in FIG. 4 which illustrates subsystems selected from and providing a combination of two or more multiple access techniques: CDMA, FDMA and TDMA. The subscriber lines 1 and 2 each connect to respective subscriber line interfaces 30 and 40, which each contain ring detect circuit 31, off hook circuit 32, and duplex audio circuit 33. The ring detect circuit 31 converts an incoming subscriber line ring signal to a control signal for the system controller 42. Off hook circuit 32 accepts an off hook command from system controller 42 and captures the subscriber line 1. Duplex audio circuit 33 connects bidirectional audio signals between line 1 and digital signal processing (DSP) blocks 34 and 35 which interface with digital data MUX (multiplexer) 43 and system controller 42. The DSP blocks include analog-to-digital and digital-to-analog converters called codecs 34 and digital data compression/expansion circuits 35.

Alternatively, the preferred embodiment can directly transmit digital data by eliminating the analog-to-digital converters 34 and directly connecting a digital input in place of the output of the analog-to-digital converter 34. The preferred embodiment can also directly produce digital output by eliminating the digital-to-analog converter 34 in the receiving subsystem and using the digital signal previously connected to the digital-to-analog converter 34 as the digital output. This could be used to provide a direct interface to an ISDN data or facsimile device.

The TDMA (time division multiple access) subsystem 41, between the system controller 42 and data MUX 43, multiplexes the transmit and receive functions performed in the CDMA/FDMA (code and frequency division multiple access) circuits with the incoming and outgoing voice data streams and control signals for ring and off hook/busy. For example, in one embodiment which relies primarily on time and code division multiple access techniques, the system controller 42 divides the total system time into blocks of 10 microsecond duration. During the first half of the block the base unit 3 transmitter is enabled, and transmits data from subscriber lines 1 and 2 in two 2.5 microsecond windows to the extension units 5, 8 and 11 (see FIG. 1). During the second half of the block, the base unit 3 receiver is enabled and data is received from two extension units in two 2.5 microsecond windows and transferred t subscriber lines 1 and 2 via subscriber line interfaces 30 and 40. Short time spaces between transmit and receive windows and modes allows for signal propagation delays between the base and extension units.

In addition to TDMA (time division multiple access), FIG. 4 illustrates the use of CDMA and FDMA in the line carrier transceiver section. A pseudonoise (PN) code generator 44 and carrier frequency oscillator 56, by means of a modulator 48, produces a spread spectrum line carrier. In one embodiment the oscillator 56 runs at 10 MHz and the PN code rate is 5 MHz, producing a spread spectrum main lobe bandwidth from 5 to 15 MHz. Use of 4095+ bit (chip) code length ensures reasonable privacy and security and minimizes interference with other types of equipment. An FSK (frequency shift key) modulator 49 modulates the carrier with the data to be transmitted. Some other forms of data modulation can also work with spread spectrum modulation, such as BPSK (biphase shift key), QPSK (quadriphase shift key), MSK (minimum shift key) and FM (frequency modulation). Code selection switches and oscillator/carrier frequency switches can provide user changeability of CDMA and FDMA parameters to minimize collision potentials between physically proximate systems.

To accommodate the variation in distances between the base unit and the several extension units and to still maintain carrier lock with the system oscillator, the base receiver comprises a plurality of PN (pseudonoise) generators 45 an 46 which are delayed in time from the transmitter PN generator 44 as selected by the system controller via PN MUX (multiplexer) 47 to provide the correct PN phase to the CDMA correlator 52 permitting correlation of extension CDMA signals coming from the AC lines 4 through coupler 55 and filter 51 to said correlator/demodulator 52. The correlated receiver signals are amplified and filtered by IF 53 prior to demodulation by data demodulator 54. The digital data MUX 43 insures that the right data is transferred to the right subscriber line interface during its assigned TDMA window.

The use of TDMA (time division multiple access for transmit and receive modes as well as for the duplex data for each subscriber line allows the transmitters and receivers of both the base 3 and extension units 5, 8, and 11 (see FIG. 1) to operate at the same carrier and IF frequencies. Frequency division multiple access is not required if no near neighbors are using the transmission medium.

Another embodiment of the present invention does not require the use of TDMA (time division multiple access) if FDMA (frequency division multiple access) is employed for each data channel. The transmitters in the base 3 and extension units 5, 8, and 11 send data on two or more carrier frequencies simultaneously, and the receivers have corresponding correlators 52 for each transmitted data channel. Carrier frequencies and corresponding heterodyne correlator frequencies can be synthesized so that single or multiple IF's (intermediate frequencies) can be employed to reduce mutual interference between subsystems in a unit. Differing CDMA codes can also be used in each data channel to reduce mutual interference with other data channels. Care must also be taken to avoid collisions between carrier and code rate harmonics.

Figure 5:
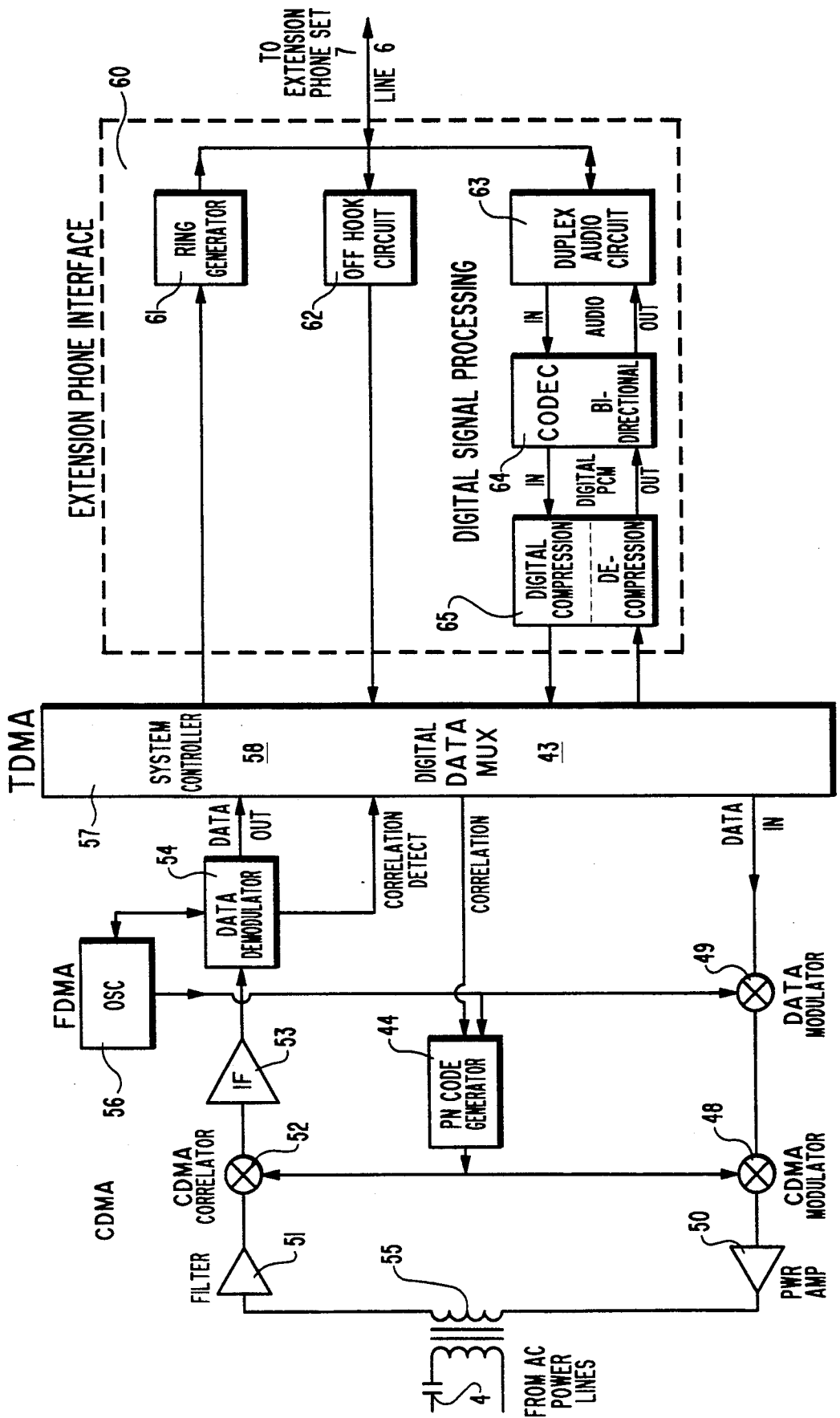
FIG. 5 is an electrical block diagram of an extension unit of a multiple access line carrier telephone extension system in accordance with one presently preferred embodiment of the present invention, the extension unit interfacing an extension phone to the power line distribution system of a building.

FIG. 5 illustrates one presently preferred embodiment of a multiple access extension unit in accordance with the present invention. As shown, the extension unit diagramed in FIG. 5 contains most of the same subsystems as the base unit of FIG. 4, and the same reference numerals are accordingly employed. There is, however, one notable exception: the additional PN (pseudonoise) generators 45 and 46 of the base unit are omitted in the extension unit. The same type of PN code generator 44 which is used to correlate the received spread spectrum carrier signal in the base unit is used in the extension unit to CDMA modulate the transmitter data returning to the base unit. Thus, referring to FIG. 1 and 5, multiple access carrier signals from the base unit 3 are carried by power lines 4 to extension units 5, 8 and 11 and coupled via AC line coupler 55 and filter 51 into the CDMA correlator 52. The recovered data modulated carrier is amplified and filtered by IF (intermediate frequency) amplifier 53 and sent to data demodulator 54 where the data is recovered and multiplexed 43 to the extension phone interface 60 where digital decompression (expansion) 65 and digital to analog converter 64 provide duplex audio to the extension phone line 6 and set 7. Similarly, audio returning from the extension line 7 to the subscriber line 1 passes through duplex conversion 63, A/D conversion 64 and DSP compression 65 to TDMA controller 57 where data MUX 43 sends the signal in its appropriate time window to data modulator 49, CDMA modulator 48, power amp 50 and AC line coupler 55 into power lines 4 and on its way to the base unit 3.

The system controller 58 of the extension unit of FIG. 5 can differ from the system controller 42 of the base unit 3 in that the former contains multiple extension arbitration logic. For example, in one embodiment, only one extension phone set is permitted to use one subscriber line at a time. If several extension sets are assigned to one subscriber line and a first extension is using that line, then when a second extension set is taken off hook, the second extension unit will check the base unit transmissions to determine that the assigned subscriber channel is already in use by an other extension unit and will emit a busy tone to the second extension phone set. Desired protocols may be installed in the system control logic to handle various requirements. A programable logic device can be used to implement this function and provides for reprogramming the desired protocols.

Figure 6:
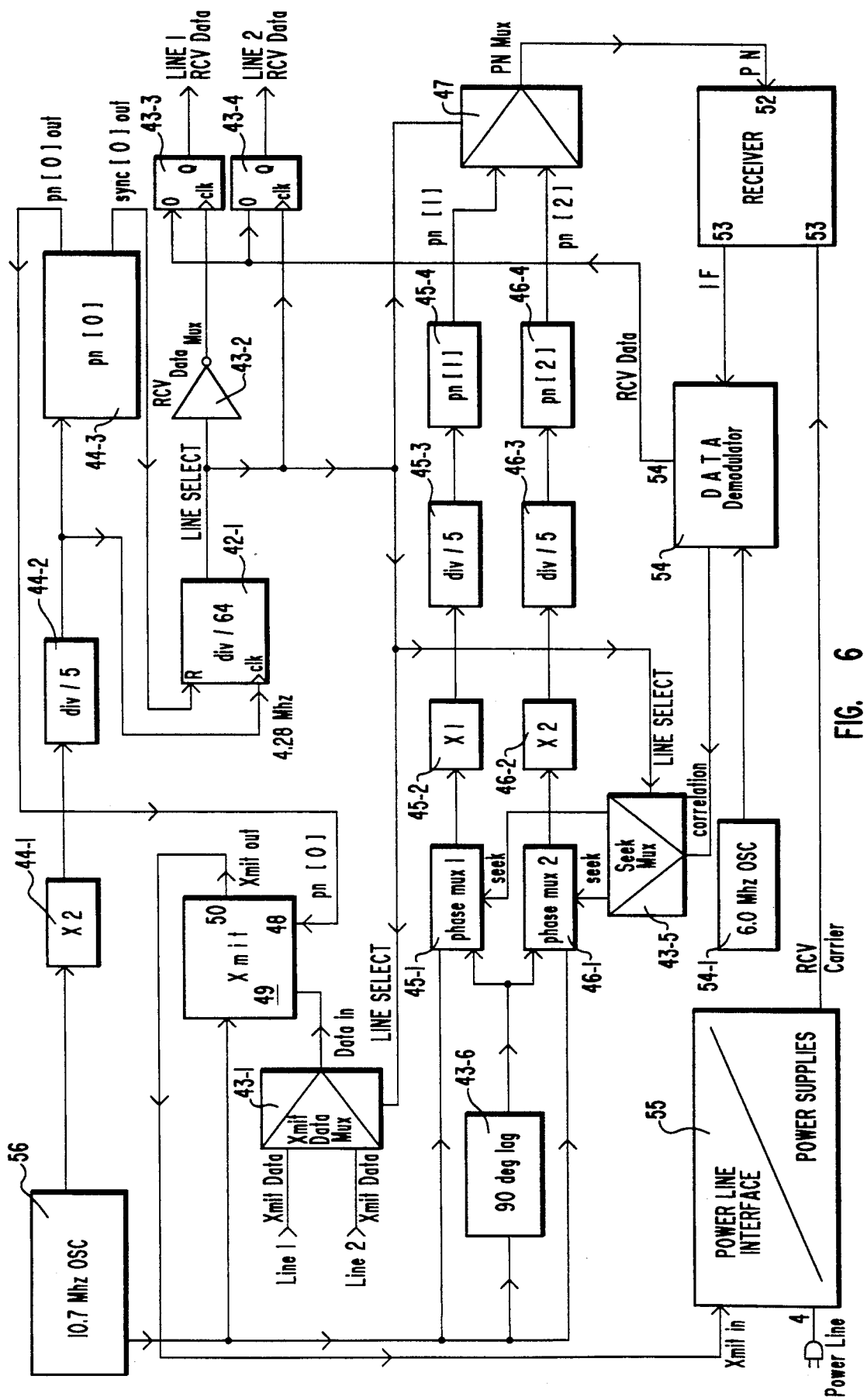
FIG. 6 is a schematic and block diagram illustrating one presently preferred embodiment of the base unit system diagram of FIG. 4, including the associated transmitter and receiver subsystems.
Figure 7A:
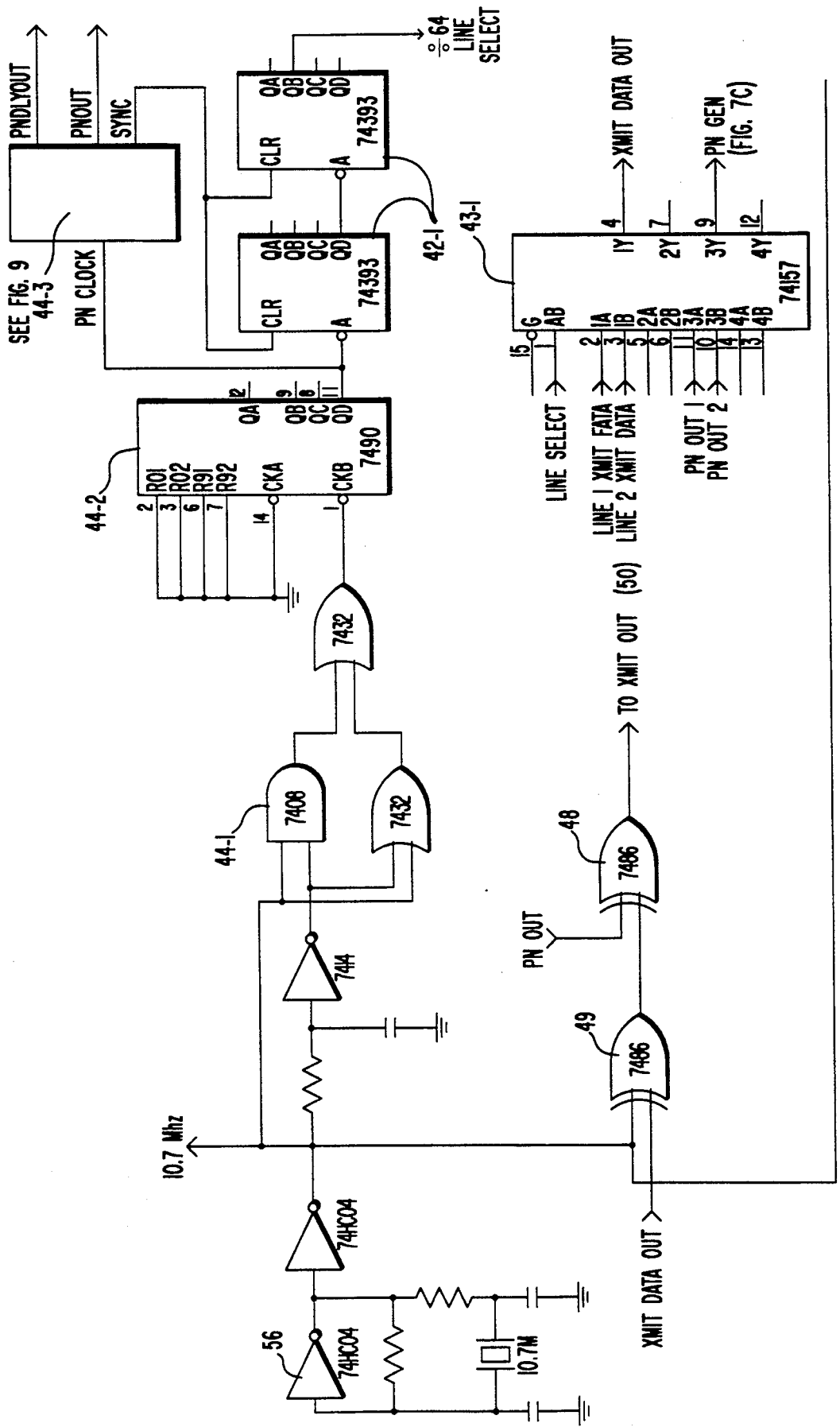
FIGS. 7A, 7B, 7C, 7D and 7E) is a schematic diagram of base unit subsystems described in FIG. 6.
Figure 7B:
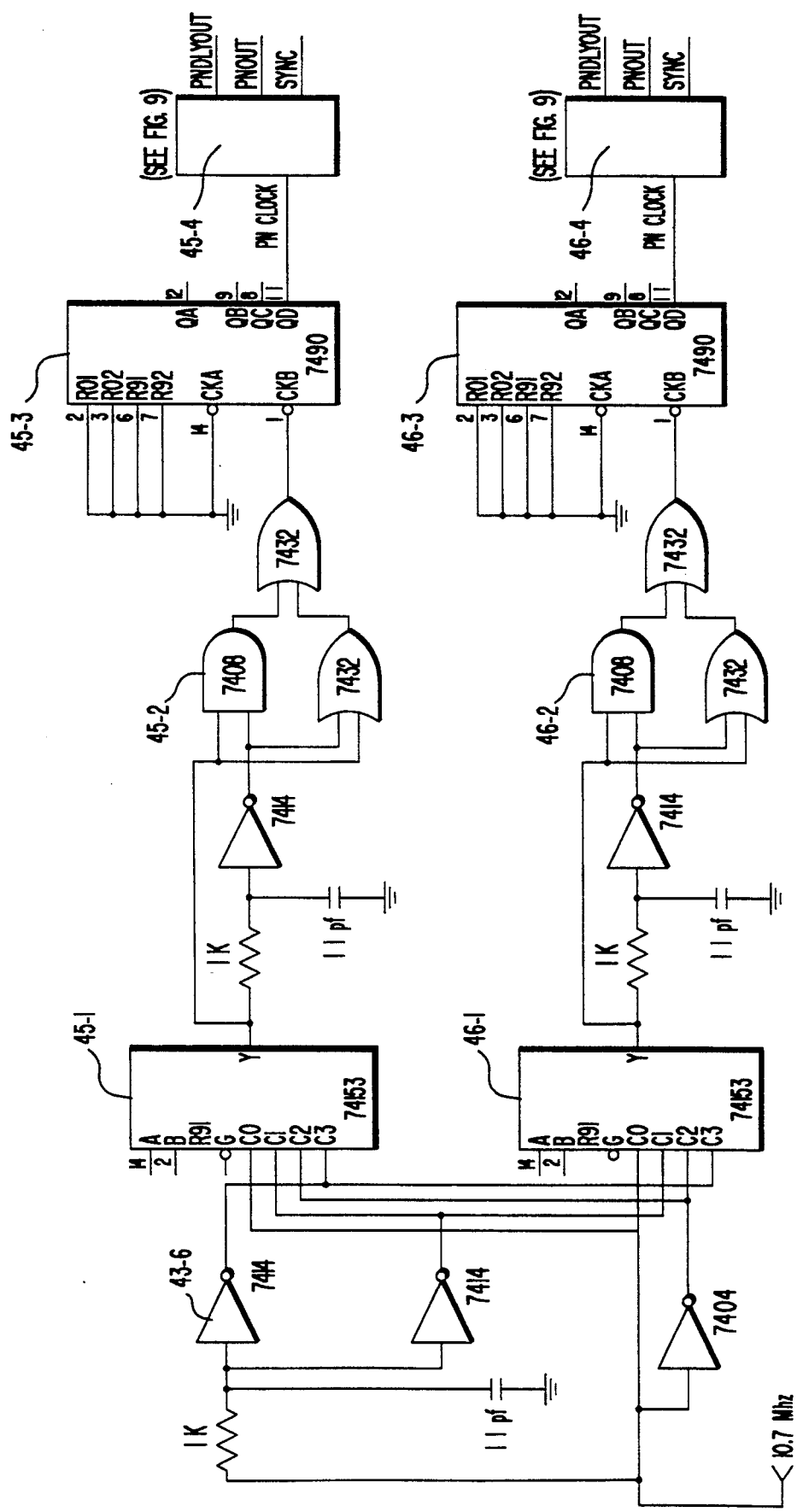
Figure 7C:
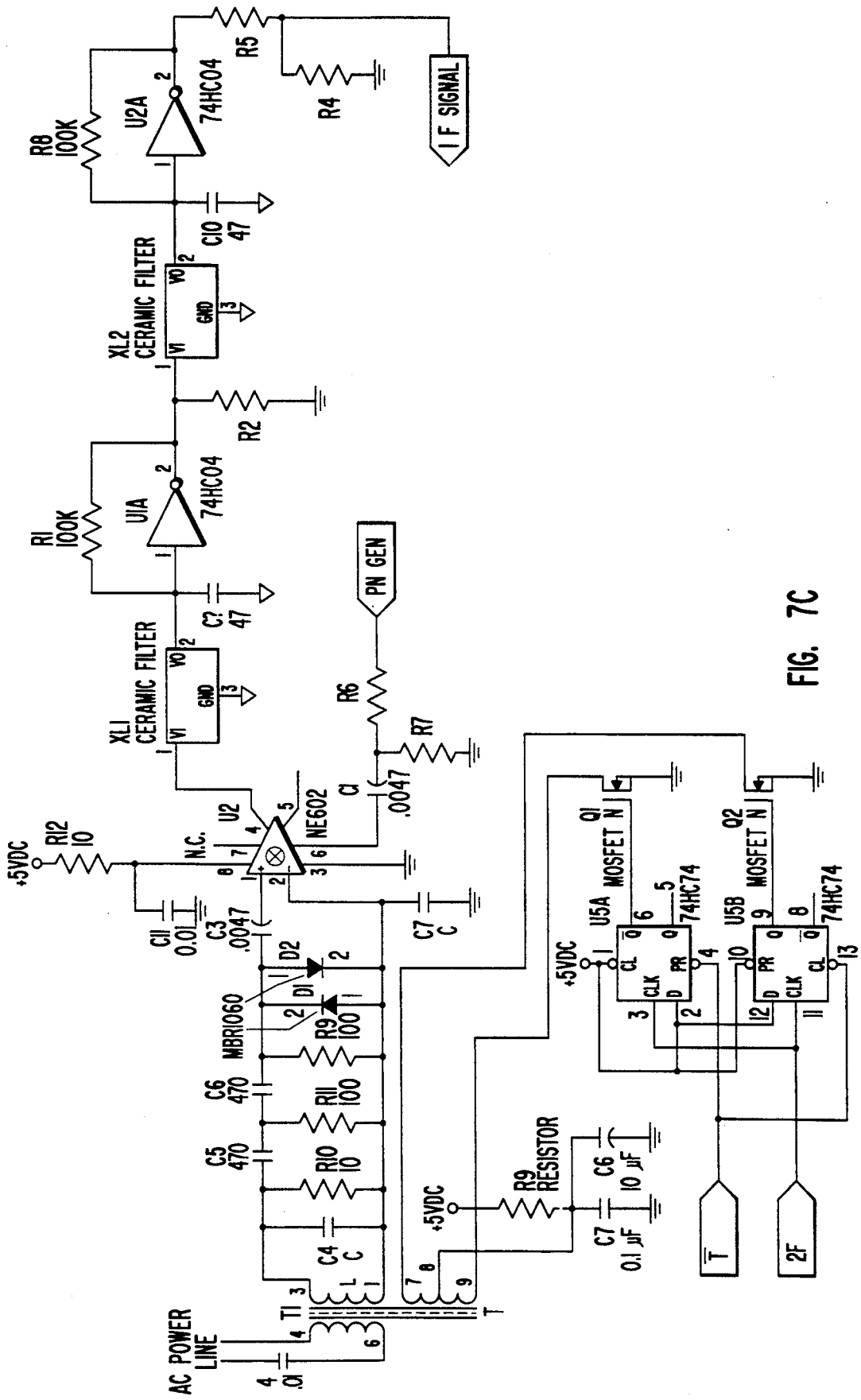
Figure 7D:
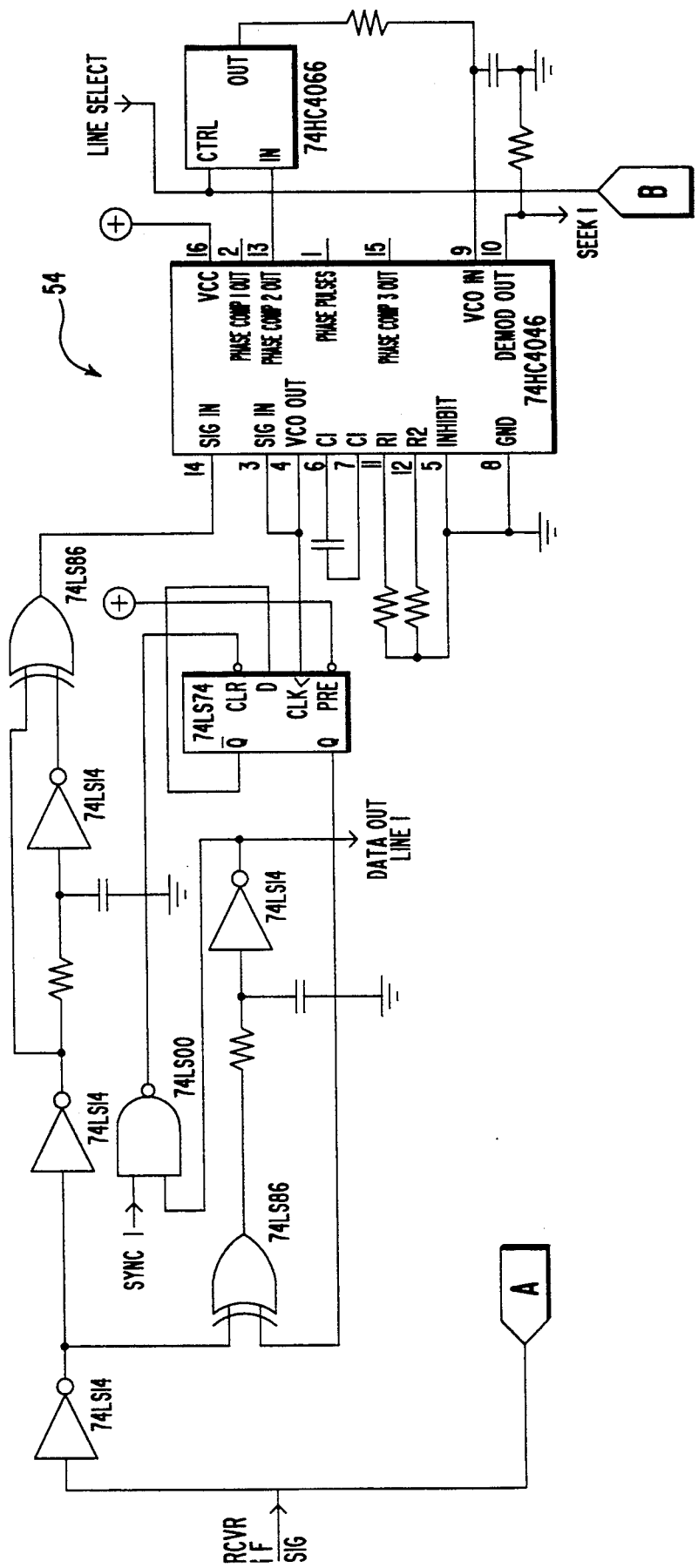
Figure 7E:
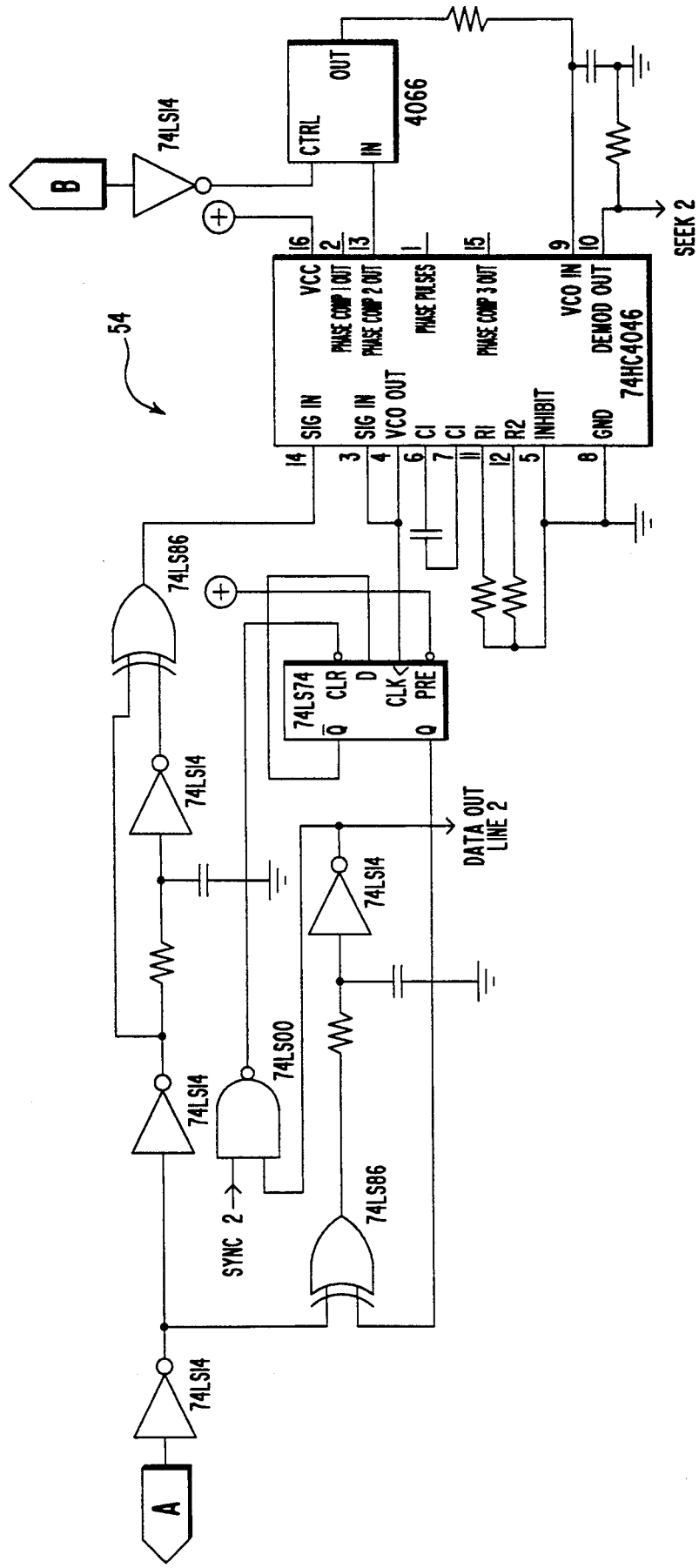

Reference is next made to FIG. 6 and 7, which illustrate in more detail a block diagram and schematic diagram of one preferred embodiment derived from the functional block diagram of FIG. 4. Those of ordinary skill in the art will, of course, appreciate that various modifications to the block diagram of FIG. 6 and corresponding schematic diagram of FIG. 7 may easily be made without departing from the essential characteristics of the invention, as described in connection with the block diagram of FIG. 4 above. Thus, the following description of the detailed diagrams of FIGS. 6 and 7 is intended only as an example, and it simply illustrates one presently preferred embodiment of a schematic diagram that is consistent with the foregoing description of FIG. 4 and the invention as claimed herein. Components of FIGS. 6 and 7 which correspond to functional components of FIG. 4 are designated by the same initial reference numbers. Thus, for example, components which correspond to CDMA PN code generator transmitter 44 of FIG. 4 are designated in FIG. 6 as 44-1, 44-2 and 44-3.

FIGS. 6 and 7 illustrate a specific embodiment of the system controller 41 for a base unit 3 in which three multiple access techniques are employed to provide a two line extension system, which requires four data channels, two for each line. FDMA (frequency division multiple access) is employed to multiple access the transmit and receive function, wherein the transmitter 48-50 operates at 10.7 MHz and the receiver 51-53 at 6 MHz.

CDMA (code division multiple access) is employed in the transmitter and receiver PN (pseudonoise) code generators 44-3, 45-4 and 46-4 to reduce mutual interference between the stronger local transmitter signals and the weaker extension unit signals. In the instant embodiment, this is accomplished by offsetting the phase relationships of the similar code sequences of the three PN generators relative to one another. This code phase offset is partly accomplished as a natural consequence of the differing distances of the extension units 5, 8 and 11 from the base unit 3 (see FIG. 1).

To obtain the four data channels, two data channels each for the transmitter and receiver, TDMA (time division multiple access) is employed to multiplex the data for lines 1 and 2 to the transmitter (through multiplexer 43-1) and from the receiver (through demultiplexer 43-2,3,4) at a 50% duty cycle as synchronized by the PN (pseudonoise) codes and divider counter 42-1. Thus, at the beginning of each 8191 chip code sequence, the divide by 64 line select counter 42-1 is reset, and the 4.28 MHz chip clock from 44-2 clocks both the PN generator 44-3 and the TDMA line selector 42-1, which alternately selects data at the rate of 67 KHz, providing a bit rate for each channel of 33.5 KHz or 67 KBs.

A detailed description of the system controller circuitry of FIG. 6 follows. Power line interface or AC line coupler 55 connects bidirectional carrier signals from AC power lines 4 to the transmitter 50 and receiver 51. The output of transmitter oscillator 56 is doubled by a conventional pulse edge detector frequency doubler 44-1 and subsequently divided by five with counter 44-2, producing a 4.28 MHz chip clock for clocking PN generator 44-3, said PN generator having 13 stages and producing an 8191 chip long code sequence and a sync out pulse at the start of each new sequence for resetting line select counter 42-1. The 4.28 MHz chip clock also clocks the line select counter 42-1, which clocks line 1 and line 2 data multiplexers 43-1,2,3,4 as well as seek multiplexer 43-1 and PN multiplexer 47.

Thus, line 1 and line 2 transmit data from the subscriber line interfaces enter transmit data MUX 43-1, where the data modulates the 10.7 MHz carrier at 49 and which is further code division multiple access modulated at 48 and via transmitter output 50 sent to the power line coupler 55. The receiver data for sending back to the subscriber line interface is received from the power line 4 via interface 55 and filter 51 and presented to CDMA correlator 52 which recovers the data modulated 6 MHz carrier 53. Separate PN generators 45 and 46 are provided because the distance from the base unit and resulting propagation delay for each extension unit may differ, which causes the PN phase relationships between the transmitter PN[0] generator 44-3 and the receivers' PN[1] 45-4 and PN[2] 46-4 to be delayed in time.

During the initiation of communication, synchronization of each receiver PN generator with that of the extension unit transmitter is required. This is achieved by providing a PN code seek and lock circuit consisting of 90 degree lag circuit 43-6 in combination with phase multiplexers 45-1 and 46-1, seek multiplexer 43-5 and the correlation output of data demodulator 54.

The seek function is provided at all times when correlation is not detected, and is effected by individually retarding the phase of the clock signal (10.7 MHz) input to each uncorrelated receiver PN generator (PN[1] 45-2,3,4 and PN[2] 46-2,3,4) at the line select rate by means of 90 degree lag circuit 43-6 and phase multiplexers 1 and 2 45-1 and 46-1. The 90 degree lag circuit 43-6 supplies all four phases of the clock to the phase multiplexers, which select in a retarding order one of the phases by means of a two bit binary counter which is clocked by each line select pulse.

The seek mode of operation continuously and progressively retards each receiver PN code phase by 90 degrees every 64 chips until the data demodulator detects correlation of an incoming signal from one of the extension units assigned to a specific line, whereupon the seek mode for that line is converted to the operating mode for said line and the phase multiplexer and PN generator hold the correlating phase relationship and the transmit and receive data channels for said line are activated. The seek multiplexer 43-5 insures that the uncorrelated channel for the unused line continues in the seek mode until correlation for said unused line is detected.

Many of the subsystems illustrated in FIGS. 4-6 can be implemented with readily available and second sourced commercial components. For example, ring detect 31, off hook circuit 32 and duplex audio circuit 33 are elements of a subscriber loop interface circuit ("SLCI"). The codec 34 and compression function 35 can be constructed with industry standard 2913-2917 devices. The codec can also be a newer oversampled sigma-delta coder with DSP decimation and companding, as described in several articles such as that by Freedman et al., "IEEE Journal of Solid-State Circuits", Vol. 24, No. 2 (U.S.A., April 1989), pp. 274-280, and manufactured by AT&T as a T7510. The PN (pseudo noise) code generator can be a 13 stage modular shift register generator (MSRG) or a Gold code sequence generator as described by Dixon at pp. 65-81 and implemented with MC8504's (or equivalent shift register chips) and exclusive-or gates. The CDMA modulator 48 can be as simple as an exclusive-or gate with the carrier frequency and the PN code as its inputs or a balanced modulator such as a Signetics NE602 or older circuits described by Dixon at pp. 109-113. Similarly, the CDMA correlator/demodulator 52 can be an NE602. The IF (intermediate frequency) amplifier and filter 53 and demodulator 54 can consist of an NE604 or a CA3089. The digital data MUX 43 consists of digital gates or bilateral switches (CD4066). The application notes of numerous manufacturers provide detailed examples and engineering data on the implementation of the functions described in this paragraph.

The TDMA (time division multiple access) system controller 42, on the other hand, is a unique sequential and state logic machine, an embodiment of which is described in detail above in connection with FIG. 6. In addition, it should be appreciated that cost and size limitations apply to discrete implementation of complex circuit embodiments, which motivates the integration of most functions of the present invention into a single low-cost application specific integrated circuit (ASIC).

Following is a table which further lists specific electrical component parts that might be used to implement the functions and subsystems of the present invention, as illustrated and described above in connection with FIGS. 4-6. Those skilled in the art will readily appreciate, however, that other specific circuitry and components may be equally well adapted to the implementation of the principal functions of this invention. Thus, the following list of specific components is intended only as an illustration, and merely represents one presently preferred embodiment of the invention. For simplicity, components are identified in the following table by the corresponding reference numbers used in Figures and FIG. 4-9.

TABLE I

Specific Electrical Components Comprising the Embodiment of FIGS. 4-6

| Reference No. | Part No. | Manufacturer |
|---|---|---|
| 31 | MC33120 | Motorola |
| 32 | MC33120 | Motorola |
| 33 | MC33120 | Motorola |
| 34 | 2913 | {Texas Instruments |
| 35 | 2917 | {Intel Lattice |
| 42 | | |
| 42-1 | 74393 | National, Motorola, Etc. |
| 43 | | |
| 43-1 | 74157 | |
| 43-2 | 7404 | |
| 43-3 | 7474 | |
| 43-4 | 7474 | |
| 43-5 | 75157 | |
| 43-6 | 7474 | |
| 44 | | |
| 44-1 | 7408,-14,-32 | |
| 44-2 | 7490 | |
| 44-3 | 74194, 7474, 7486 | |
| 45 | | |
| 45-1 | 74157 | |
| 45-2 | 7414, 7408 | |
| 45-3 | 7490 | |
| 45-4 | 74194, 7474, 7486 | |
| 46 | | |
| 46-1 | 74157 | |
| 46-2 | 7414, 7408 | |
| 46-3 | 7490 | |

TABLE I-continued

Specific Electrical Components Comprising the Embodiment of FIGS. 4-6

| Reference No. | Part No. | Manufacturer |
| --- | --- | --- |
| 46-4 | 74194, 7474, 7486 | |
| 47 | 74157 | |
| 48 | NE602, 7486 | Signetics |
| 49 | 7486 | |
| 50 | 7404 | |
| 51 | RC, LC | Low Pass Filter |
| 52 | NE602 | Signetics |
| 53 | NE604 | Signetics |
| 54 | NE604 | Signetics |
| 54-1 | | |
| 55 | | |
| 56 | | |
| 57 | | |
| 58 | | |
| 61 | | |
| 62 | | |
| 63 | | |
| 64 | | |
| 65 | | |

Figure 8:
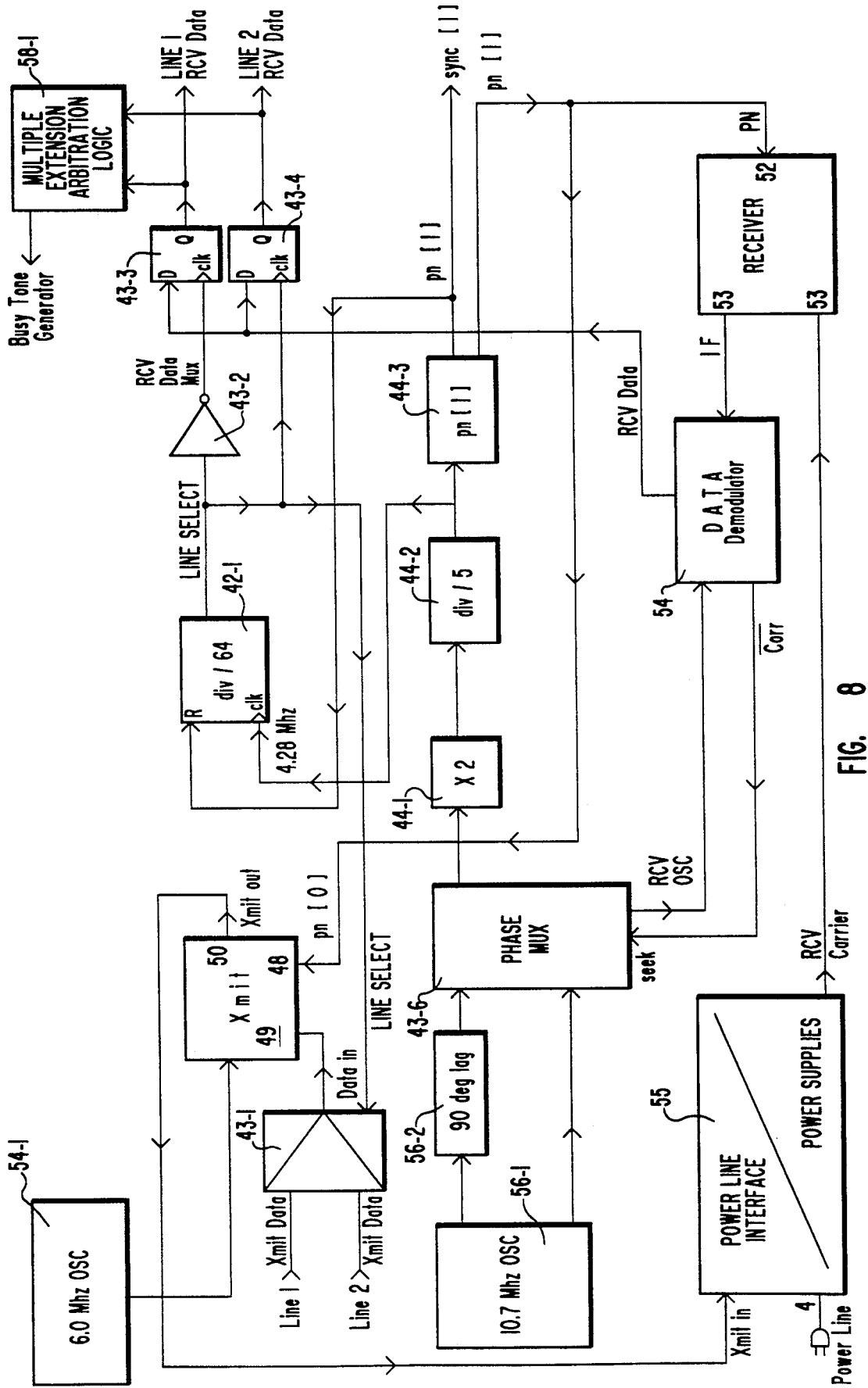
FIG. 8 is a block diagram of an extension unit system controller and digital data multiplexer, including the associated transmitter and receiver subsystems.
Figure 9A:
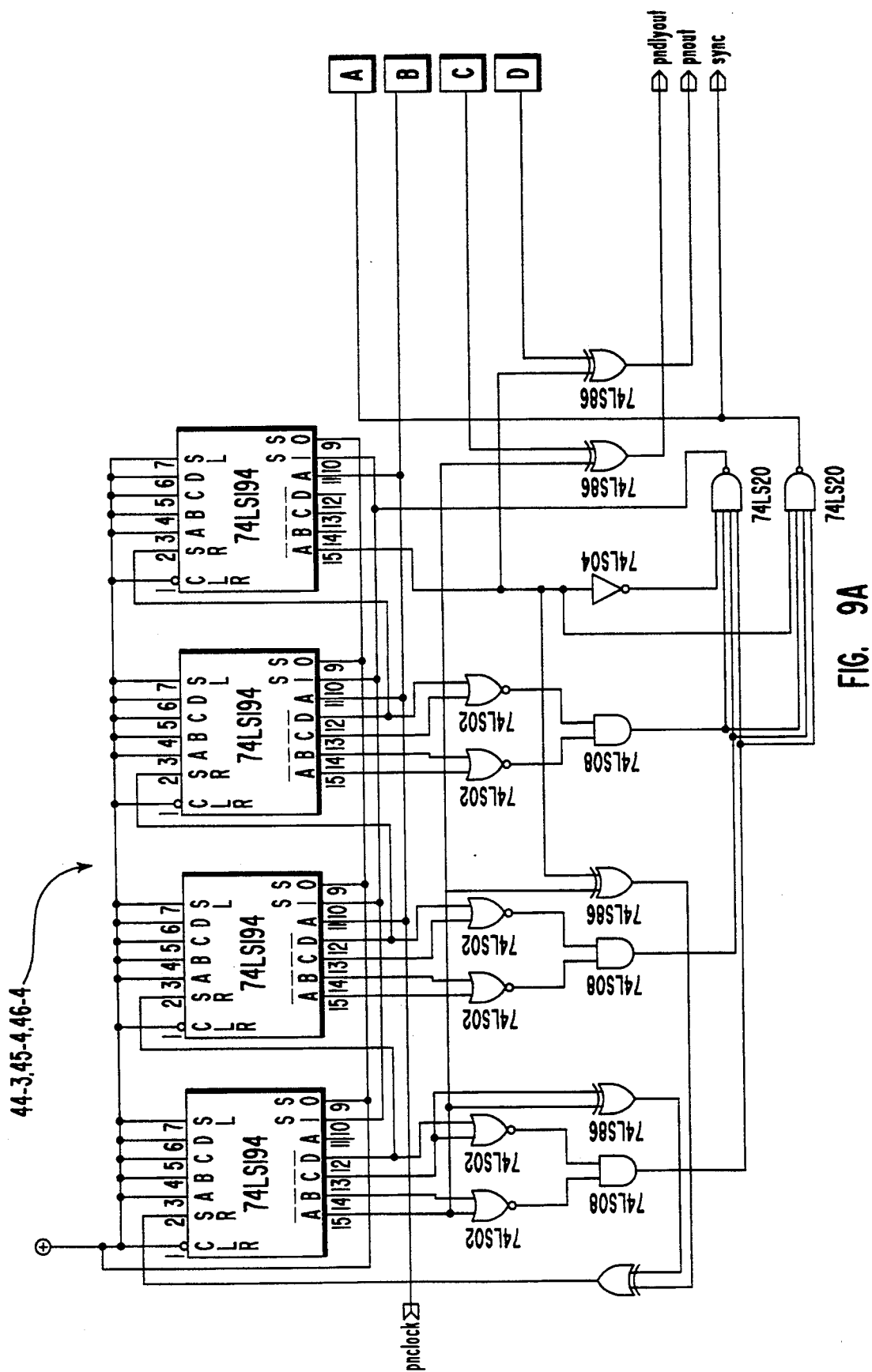
FIG. 9A and 9B are a complete schematic diagram of the PN generator employed in FIGS. 6 through 8.
Figure 9B:
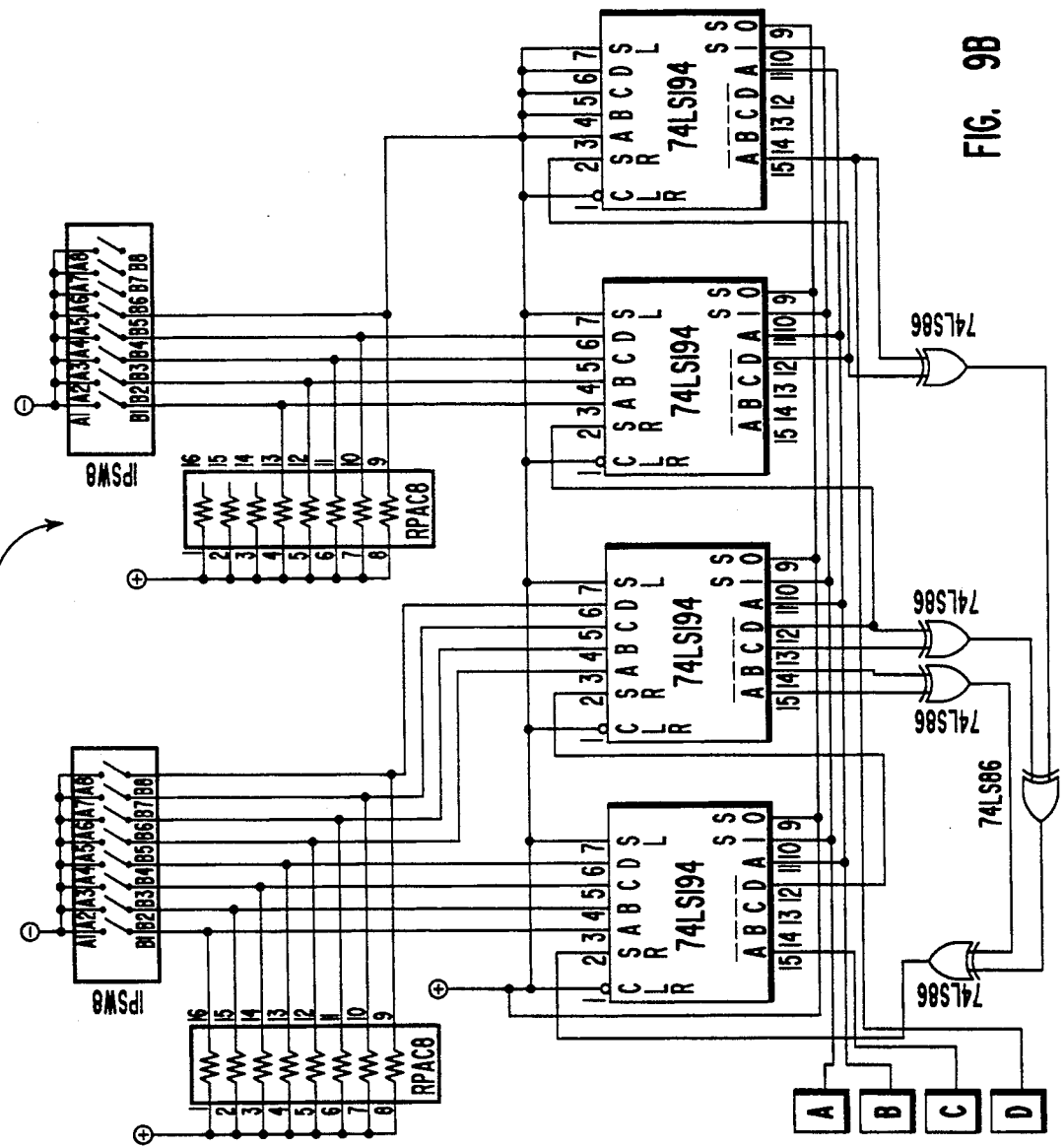

An embodiment of the extension controller 57 is illustrated in FIG. 8. Power line interface 55 connects the power line 4 with the transmitter 50 and receiver 51. The transmitter operates at a carrier frequency of 6 MHz which is substantially different from that of the receiver's 10.7 MHz 56-1. A sufficient difference in carrier frequency allows for simultaneous operation of both the receiver 51 and transmitter 50 with support from other subsystems including filters and hybrid circuitry in power line interface 55 and a phase offset in receive and transmit pseudonoise (PN) codes at PN code generator 44-3, said code offset providing a spreading instead of a correlation of the transmitter signal 50 which may bleed over into the receiver 51. While the offset PN output is easily obtained by using the existing output of one of the last stages of the modular shift register generator employed in the PN generator 44-3, a separate PN generator and code could also be employed. The use of a heterodyne correlator in receiver 52 in combination with a frequency synsthesized local oscillator mixed with PN code 44-3 enhances the flexibility for performing frequency division multiple access. Frequencies of all subsystems are carefully selected to avoid fundamental, harmonic and image frequency interference.

In the extension unit (5) embodiment of FIG. 8 the base carrier signal enters the filter 51 and is correlated and mixed with the PN code at correlator 52 recovering the data modulated intermediate frequency signal at 53, which signal is demodulated at 54 and the data sent to data demultiplexer 43-3 and 43-4, which demultiplexer sends the correct data to line 1 and line 2 extension phone interfaces. Multiple extension arbitration logic 58-1 continuously monitors the data and operating state of each line to provide a busy tone indicator to a user of one extension unit attempting to use a line which is being used by another extension unit. This is possible because all extension units 5 receive data from the base unit 3 but do not transmit data back to said base unit unless a user takes the particular extension unit off hook and the line is not already in use by another extension unit. Physically, the arbitration logic controller is composed of several gates and flip-flops. PN code correlation is provided by a seek circuit composed of 10.7 MHz oscillator 56-1, 90 degree lag 56-2 and phase multiplexer 43-6, which multiplexer clocks the PN generator 44-1,2,3 and periodically selects the next 90 degree retarded phase of the oscillator during correlation seeking state of the receiver, until the data demodulator detects a strong and correlated intermediate frequency signal at receiver IF 53, whereupon seeking is terminated and the base and extension PN codes are synchronized. The sync output of the PN generator 44-3 resets the time division multiple access line select counter 42-1, which divides the chip (PN clock) rate by 64 or another suitable number depending on clock rates and data rates. The line select output of counter 42-1 drives the received data demultiplexer 43-3 as well as the transmit data multiplexer 43-1, which selects which data modulates the 6 MHz carrier oscillator 54-1 at transmitter 49 and is mixed with PN code at mixer 48 for transmission back to the base unit by output 50.

Many variations on the system illustrated the figures will be readily apparent to one of ordinary skill in the art from previous discussions herein. One such variation is the application of the herein described CDMA, TDMA and FDMA techniques to a cordless telephone system, wherein an RF carrier replaces the power line carrier and an antenna replaces the power line interface. Hence, the communications medium is the only real difference, while the multiple access requirements remain the same, and FIG. 3 applies to a cordless telephone system as well as to a line carrier system.

From the above discussion, it will be appreciated that the present invention provides an effective method of multiple access communication which provides for multiple access of a plurality of signals on a single communications medium. The system and method of the present invention also utilizes both TDMA (time division multiple access) and CDMA (code division multiple access) to permit high data rates and multiple access by two or more telephone lines. CDMA (code division multiple access) is also utilized to provide a high degree of security for preventing unauthorized access to the subscriber's line, and which provides privacy with respect to the conversation from third parties.

Additionally, the present invention provides a method and system of code synchronization to provide multiple extensions for the same subscriber line which do not interfere with each other. The system and method of the present invention utilizes FDMA (frequency division multiple access) in combination with CDMA (code division multiple access) to prevent interference between relatively close neighboring transmission systems or partner transmissions in the same system and to provide for multiple access (simultaneous transmission) of duplex signals for at least one telephone line. Moreover, the present invention provides a method and system of multiple access telephone extension communications which applies equally well to both cordless and line carrier telephone extension systems and methods.

The present invention may be embodied in other specific form without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A telephone communications system, the system comprising:
   (a) a base unit comprising:
      (i) a first transmitter subsystem,
      (ii) a first receiver subsystem, and
      (iii) means for connecting said first transmitter subsystem and said first receiver subsystem to a telephone line;
   (b) an extension unit comprising:
      (i) a second transmitter subsystem, and
      (ii) a second receiver subsystem; each of said first and second transmitter subsystems comprising:
      (a) means or converting analog telephone communications signals to digital data signals;
      (b) means for generating a transmission carrier controlled by at least one multiple access means, said at least one multiple access means being selected form the group consisting of:
         (i) time division multiple access multiplexing means for controlling the times at which the digital data signals are transmitted; and
         (ii) frequency division multiple access means for changing said transmission carrier's frequency;
      (c) means for generating a pseudonoise code;
      (d) means for modulating said transmission carrier by said digital data signals and said pseudonoise code to produce a direct spread code division multiple access signal; and
      (e) means for coupling said direct spread code division multiple access signal to a communications medium;
   and each of said first and second receiver subsystems comprising:
      (a) means for receiving said direct spread code division multiple access signal from said communications medium;
      (b) means for recovering said modulated transmission carrier from said received direct spread code division multiple access signal; and
      (c) means for demodulating said recovered modulated transmission carrier to produce digital data corresponding to said analog telephone communications signals.

2. A telephone communications system as in claim 1 further comprising off hook circuitry for detecting off hook status in said extension unit and placing said telephone line connecting means of said base unit into an off hook condition.

3. A telephone communications system as in claim 1, said base unit further comprising ring detect circuitry for detecting ring signals on said telephone line and transmitting a ring command to said extension unit; and said extension unit further comprising ring generator circuitry for generating a ring signal in said extension unit upon receipt of said ring command.

4. A telephone communications system as in claim 1, wherein said means for coupling said direct spread code division multiple access signal to a communications medium comprises an RF antenna.

5. A telephone communications system as in claim 1, wherein said means for coupling said direct spread code division multiple access signal to a communications medium comprises a connection to power lines of a building.

6. A telephone communications system as in claim 1, further comprising one or more additional extension units.

7. A telephone communications system as in claim 1, wherein said telephone line connecting means of said base unit connects a plurality of telephone lines to said transmitter subsystem and said receiver subsystem.

8. A telephone communications base unit comprising:
   (a) a transmitter subsystem,
   (b) a receiver subsystem, and
   (c) means for connecting said transmitter subsystem and said receiver subsystem to a telephone line;
   said transmitter subsystem comprising:
      (a) means for converting first analog telephone communications signals to first digital data signals;
      (b) means for generating a first transmission carrier controlled by at least one multiple access means, said at least one multiple access means being selected from the group consisting of:
         (i) time division multiple access multiplexing means for controlling the times at which said first digital data signals are transmitted; and
         (ii) frequency division multiple access means for changing said transmission carrier's frequency;
      (c) means for generating a pseudonoise code;
      (d) means for modulating said first modulated transmission carrier by said first digital data signals and said pseudonoise code to produce a first direct spread code division multiple access signal; and
      (e) means for coupling said first direct spread code division multiple access signal to a communications medium;
   and said receiver subsystem comprising:
      (a) means for receiving a second direct spread code division multiple access signal from said communications medium;
      (b) means for recovering a second modulated transmission carrier from said second direct spread code division multiple access signal; and
      (c) means for demodulating said second modulated transmission carrier to produce second digital data corresponding to second analog telephone communications signals.

9. A telephone communications base unit as in claim 8 further comprising off hook circuitry for placing said telephone line connecting means of said base unit into an off hook condition.

10. A telephone communications base unit as in claim 8, said base unit further comprising ring detect circuitry for detecting ring signals on said telephone line and transmitting a ring command to an extension unit.

11. A telephone communications base unit as in claim 8, wherein said means for coupling said direct spread code division multiple access signal to a communications medium comprises an RF antenna.

12. A telephone communications base unit as in claim 8, wherein said means for coupling said direct spread code division multiple access signal to a communications medium comprises a connection to power lines of a building.

13. A telephone communications base unit as in claim 8, wherein said telephone line connecting means of said base unit connects a plurality of telephone lines to said transmitter subsystem and said receiver subsystem.

14. A telephone communications extension unit comprising:
   (a) a transmitter subsystem, and
   (b) a receiver subsystem;
   said transmitter subsystem comprising:
      (a) means for converting first analog telephone communications signals to first digital data signals;

(b) means for generating a first transmission carrier controlled by at least one multiple access means, said at least one multiple access means being selected form the group consisting of;
  (i) time division multiple access multiplexing means for controlling the times at which said first digital data signals are transmitted; and
  (ii) frequency division multiple access means for changing said transmission carrier's frequency;
(c) means for generating a pseudonoise code;
(d) means for modulating said first modulated transmission carrier by said first digital data signals and said pseudonoise code to produce a first direct spread code division multiple access signal; and
(e) means for coupling said first direct spread code division multiple access signal to a communications medium;
and said receiver subsystem comprising:
  (a) means for receiving a second direct spread code division multiple access signal from said communications medium;
  (b) means for recovering a second modulated transmission carrier from said second direct spread code division multiple access signal; and
  (c) means for demodulating said second modulated transmission carrier to produce second digital data corresponding to second analog telephone communications signals.

15. A telephone communications extension unit as in claim 14, said extension unit further comprising ring generator circuitry for generating a ring signal in said extension unit upon receipt of a ring command from a base unit.

16. A telephone communications extension unit as in claim 14, wherein said means for coupling said direct spread code division multiple access signal a communications medium comprises an RF antenna.

17. A telephone communications extension unit as in claim 14, wherein said means for coupling said direct spread code division multiple access signal to a communications medium comprises a connection to power lines of a building.

18. A method for telephone communications between a first unit and a second unit, the method comprising the steps of:
(a) said first unit converting analog telephone communications signals to digital data signals;
(b) said first unit generating a transmission carrier controlled by at least one multiple access technique selected form the group consisting of:
  (i) time division multiple access for controlling the times at which the transmission carrier is transmitted; and
  (ii) frequency division multiple access for changing said transmission carrier's frequency;
(c) said first unit generating pseudonoise code;
(d) said first unit modulating said transmission carrier with said digital data signals and said pseudonoise code to produce a direct spread code division multiple access signal;
(e) said first unit transmitting said direct spread code division multiple access signal to said second unit;
(f) said second unit recovering said modulated transmission carrier from said direct spread code division multiple access signal; and
(g) said second unit demodulating said modulated transmission carrier to produce digital data corresponding to said analog telephone communications signals.

19. A method for telephone communications as in claim 18, further comprising:
(h) connecting one or more telephone lines to said first unit with corresponding ring, off hook and duplex audio signals to provide said first unit with a base unit capability.

* * * * *

UNITED STATES PATENT AND TRADEMARK OFFICE
CERTIFICATE OF CORRECTION

PATENT NO. : 5,319,634
DATED : June 7, 1994
INVENTOR(S) : David B. Bartholomew, et al It is certified that error appears in the above-indentified patent and that said Letters Patent is hereby corrected as shown below:

On the title page, item [73] Assignee, change "Phoenix Corporation" to read --Phonex Corporation--.

Signed and Sealed this

Eleventh Day of October, 1994

Attest:

BRUCE LEHMAN

*Attesting Officer*     *Commissioner of Patents and Trademarks*